United States Patent [19]

Sugiyama et al.

[11] 4,423,497
[45] Dec. 27, 1983

[54] ROTARY RECORDING MEDIUM REPRODUCING APPARATUS CAPABLE OF PERFORMING SPECIAL REPRODUCTION

[75] Inventors: Hiroyuki Sugiyama, Isehara; Masaki Sakurai; Ryozo Abe, both of Yokohama; Kenji Yoshihara, Chiba, all of Japan

[73] Assignee: Victor Company of Japan, Ltd., Yokohama, Japan

[21] Appl. No.: 310,129

[22] Filed: Oct. 9, 1981

[30] Foreign Application Priority Data

Oct. 13, 1980 [JP] Japan ............................. 55-142751

[51] Int. Cl.$^3$ ..................... G11B 21/08; H04N 5/781
[52] U.S. Cl. ................................. 369/47; 358/312; 358/313; 358/342; 358/907; 360/78
[58] Field of Search ............... 358/312, 313, 320, 321, 358/322, 323, 337, 338, 339, 907, 342; 369/43, 44, 47; 360/78

[56] References Cited

U.S. PATENT DOCUMENTS 4,331,976  5/1982  Kinjo et al. ..................... 358/342
4,340,907  7/1982  Hirata et al. ................... 369/47 X
4,360,824  11/1982 Takahashi et al. ............... 358/323

Primary Examiner—Robert L. Richardson
Attorney, Agent, or Firm—Louis Bernat

[57] ABSTRACT

A rotary recording medium reproducing apparatus for reproducing a rotary recording medium in which an information signal is recorded on a spiral track comprises a reproducing transducer having a reproducing element for reproducing signals from tracks on the rotary recording medium and a kicking mechanism for kicking the reproducing element to an adjacent track when applied with a kick pulse, and a kick pulse producing circuit for producing and supplying a kick pulse to the reproducing transducer according to a reproduction mode which is set. The kick pulse producing circuit comprises a timing signal generation circuit for generating a number of timing pulses equal to a maximum number of kicking positions for one revolution of the rotary recording medium, and judging and producing circuit for producing a kick pulse having a predetermined time width according to a judgement result obtained during a predetermined interval corresponding to a preceeding timing signal, in addition to judging whether a kick pulse is to be produced with respect to a succeeding timing pulse during the predetermined interval corresponding to each timing signal from the timing signal generation circuit.

6 Claims, 7 Drawing Figures

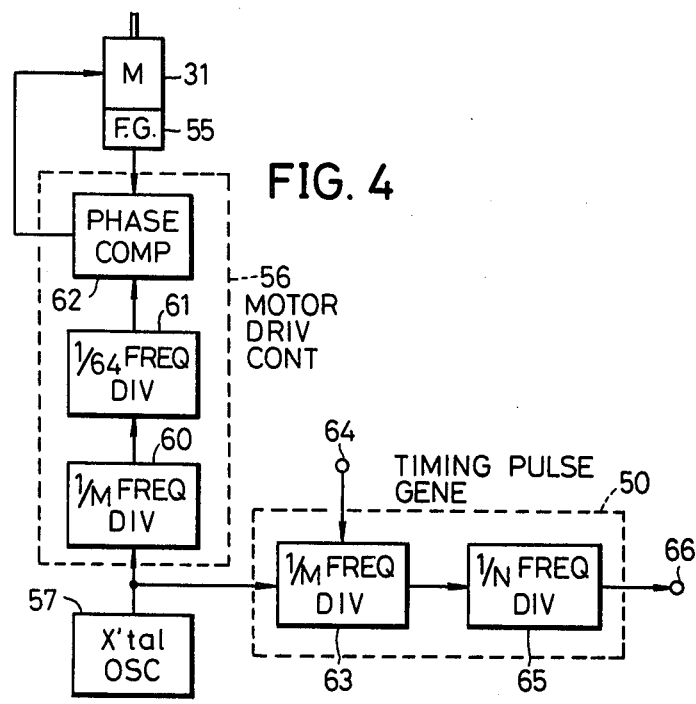

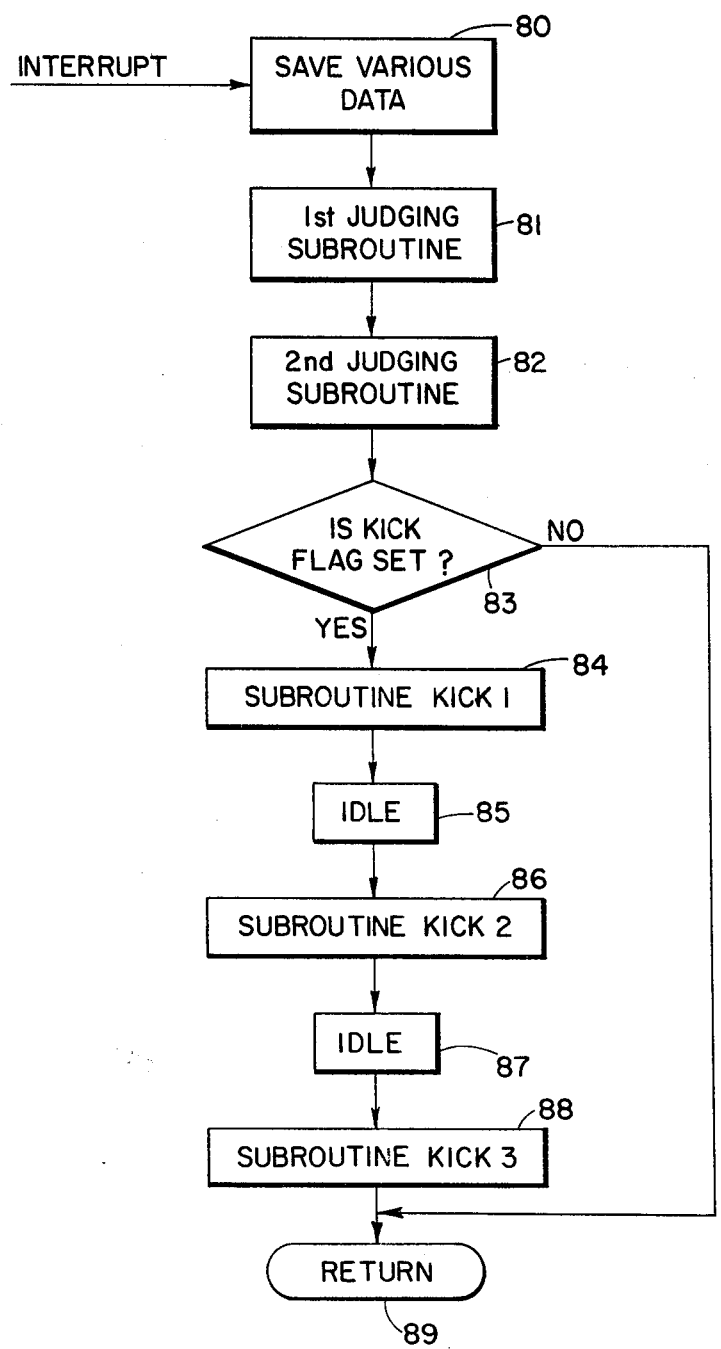

ROTARY RECORDING MEDIUM REPRODUCING APPARATUS CAPABLE OF PERFORMING SPECIAL REPRODUCTION

BACKGROUND OF THE INVENTION

The present invention generally relates to rotary recording medium reproducing apparatuses capable of performing special reproduction, and more particularly to a rotary recording medium reproducing apparatus capable of effectively judging whether a kick pulse for kicking a reproducing element is to be generated in a micro-computer during special reproduction, to effectively use saved time for other processing operations.

Systems have been realized in which a recording system forms pits in accordance with information signal being recorded along a spiral track on a flat rotary recording medium (hereinafter referred to as disc), without forming a groove therein, and a reproducing stylus traces over along this track to reproduce the recorded information signal in response to variations in the electrostatic capacitance in a reproducing system.

In this system, since no groove is provided on the disc for guiding the reproducing stylus, pilot or reference signals are recorded on or in the vicinity of a track of the information signal, such as a video signal, on the disc. Upon reproduction, the reference signals are reproduced together with the video signal. Tracking servo control is carried out so that the reproducing stylus accurately traces along the track in response to the reproduced reference signals.

In the above disc, only one of a first and second reference signals fp1 and fp2 is recorded at an intermediate position between center lines of adjacent track turns. Moreover, the side on which the first and second reference signals are recorded with respect to one track turn changes over every one track turn. That is, when the first and second reference signals are respectively recorded on the right and left sides of one track turn, the relationship between the recorded positions of the reference signals is such that the second and first reference signals are respectively recorded on the right and left sides of adjacent track turns. Furthermore, a third reference signal for obtaining a changeover signal upon reproduction, is recorded for every track turn at recording changeover positions of the above first and second reference signals.

In a reproducing apparatus, a changeover operation is performed by use of the third reference signal reproduced upon obtaining of a tracking control signal from the reproduced first and second reference signals.

Since no grooves are provided in the above disc, the reproducing stylus can be transferred from one track to another without damaging the reproducing stylus or the disc. Accordingly, in addition to the special reproduction such as still reproduction, slow-motion reproduction, and quick-motion reproduction, the system is capable of performing a so-called random access in which the reproducing stylus is transferred to a desired position at high speed to reproduce the desired information.

During still reproduction of the above special reproduction, the reproducing stylus is kicked towards the outer side of the disc for every one revolution of the disc. Hence, the reproducing stylus repeatedly reproduces only one track turn of the spiral tracks formed on the disc. Moreover, during a slow-motion reproduction, the reproducing stylus is kicked towards the outer side of the disc by a quantity which is in accordance with the slow-motion ratio, to reproduce each track a plurality of times. Furthermore, during a quick-motion reproduction, the reproducing stylus is kicked towards the inner side of the disc by a quantity which is in accordance with the quick-motion ratio, to reproduce only a part of each track turn and successively transfer to the track on the inner side of the disc. In addition, during normal reproduction, the reproducing stylus is not kicked, and scans along the spiral track to perform reproduction.

Accordingly, during a special reproduction mode, the kick pulse is produced according to the specific special reproduction mode, to kick the reproducing stylus by use of the kick pulse. The micro-computer is supplied with a timing signal produced according to the reproduced third reference signal, and produces the above described kick pulse according to the special reproduction mode which is present. When the above kick pulse is produced, the micro-computer performs a judgment operation to judge whether the kick pulse is to be produced every time the timing signal is supplied to the micro-computer. Moreover, before the above judgement operation is performed, the above micro-computer discriminates the existence or non-existence of a changeover signal of the special reproduction mode, and signal processing related to the discrimination operation.

Hence, conventionally, as well be described hereinafter in conjunction with the accompanying drawings, the micro-computer produced the above kick pulse after judging whether the kick pulse is to be produced. Therefore, substantial time was required from the time the timing signal is generated until the kick pulse is generated. Moreover, separate time intervals existed for judging whether the kick pulse is to be produced and for producing the kick pulse. Thus, there was a disadvantage in that, until the next timing pulse is obtained after the kick pulse is generated, the time interval available for other operations such as signal processing was that much shorter.

SUMMARY OF THE INVENTION

Accordingly, it is a general object of the present invention to provide a novel and useful rotary recording medium reproducing apparatus capable of performing special reproduction, in which the above described problems have been overcome.

Another and more specific object of the present invention is to provide a rotary recording medium reproducing apparatus in which a micro-computer judges whether a kick pulse corresponding to a succeeding timing signal is to be produced during an interval in which an operation is performed to judge whether a kick pulse is to be produced, and further, a kick pulse judged with respect to a preceeding timing signal is produced during this interval. According to the apparatus of the present invention, time can be effectively used to perform signal processing.

Still another object of the present invention is to provide a rotary recording medium reproducing apparatus which produces a kick pulse having a predetermined time width by an operation in which signal processing operation of a predetermined time unit is performed a predetermined number of times. According to the apparatus of the present invention, there is no need to provide a timer in the micro-computer in order to produce the kick pulse, and the circuit construction of the apparatus can be simplified.

Other objects and further features of the present invention will be apparent from the following detailed description when read in conjunction with the accompanying drawings.

BRIEF DESCRIPTION OF THE DRAWINGS

FIG. 4 is a concrete systematic block diagram showing a part of the block system shown in FIG. 3;

FIGS. 5A, 5B, and 5C are diagrams respectively showing signal waveforms of a timing signal, a kick pulse produced by a conventional apparatus, and a kick pulse produced by an apparatus according to the present invention;

FIG. 8 is a flow chart showing an example of a conventional interrupt routine of the first micro-computer;

DETAILED DESCRIPTION

First, description will be given with respect to a rotary recording medium which is reproduced by a rotary recording medium reproducing apparatus to which the periodical signal detection circuit according to the present invention can be applied, by referring to FIGS. 1 and 2.

A video signal is recorded on a spiral track with pits formed on the disc 10 responsive to the information contents of the signal. Track turns of a single continuous spiral track, corresponding to each revolution of the disc 10, are designated by $t_1$, $t_2$, $t_3$.... As shown in FIG. 1, each track turn is constituted by the formation of pits 11 of the main information signal along the plane track path and has no stylus guide groove formed therein. With respect to one track turn $t_1$, in every horizontal scanning period (H) at a position corresponding to the horizontal blanking period, pits 12 of a first reference signal fp1 are formed on one lateral side of the track as viewed in the track path direction. Pits 13 of a second reference signal fp2 are formed on the other side of the track.

At an intermediate position between center lines of adjacent track turns, only pits of either one kind of the pits 12 and 13 of the above reference signals fp1 and fp2 are formed, and with respect to one track, moreover, the sides on which the pits 12 and 13 are formed are changed over for every track turn. That is, if pits 12 and 13 are respectively formed on the right and left sides of one track turn, for example, pits 13 and 12 are respectively formed on the right and left sides of each of the adjacent track turns.

Figure 2:
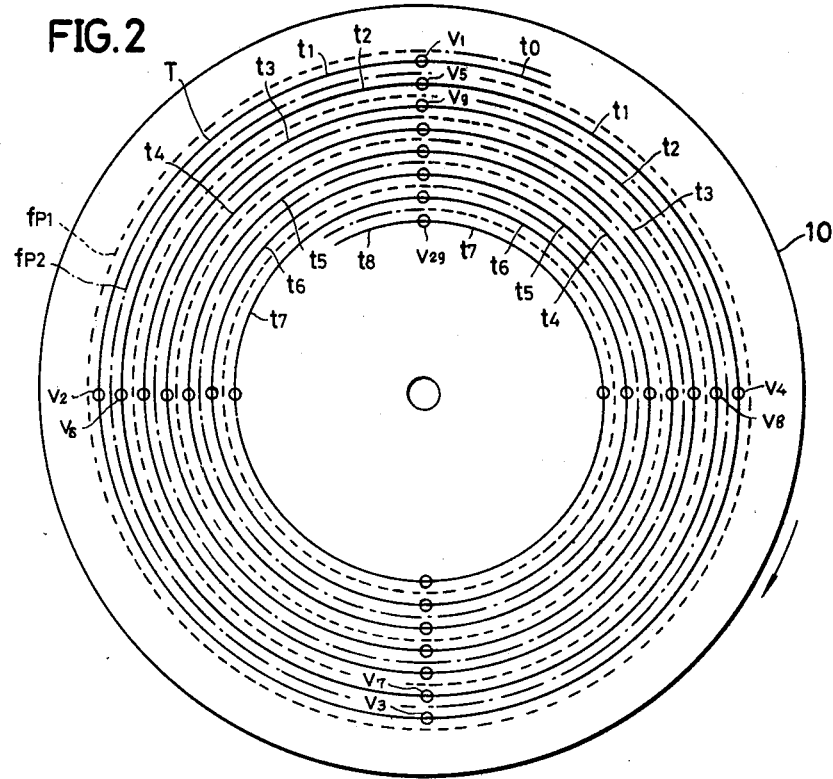
FIG. 2 is a diagram for explaining the recorded state of reference signals on a track pattern on a rotary recording medium.

As indicated in FIG. 2, a video signal is recorded along spiral track T of the disc 10 for two frames, that is, four fields, per one revolution of the disc. In FIG. 2, the tracks of the reference signal fp1 is shown by dotted lines while the tracks of the reference signal fp2 is shown by one-dot chain lines. The positions of the vertical synchronizing signals of respective fields are designated by reference characters V1, V2, V3, ..., and the successive track parts corresponding to one revolution of the disc of a single spiral track I are respectively designed by track turns $t_1$, $t_2$, $t_3$, .... Furthermore, a third reference signal fp3 is recorded at the starting end positions V1, V5, V9, ... of each track turns $t_1$, $t_2$, $t_3$, ..., that is, at positions where the reference signals fp1 and fp2 change over.

Figure 1:
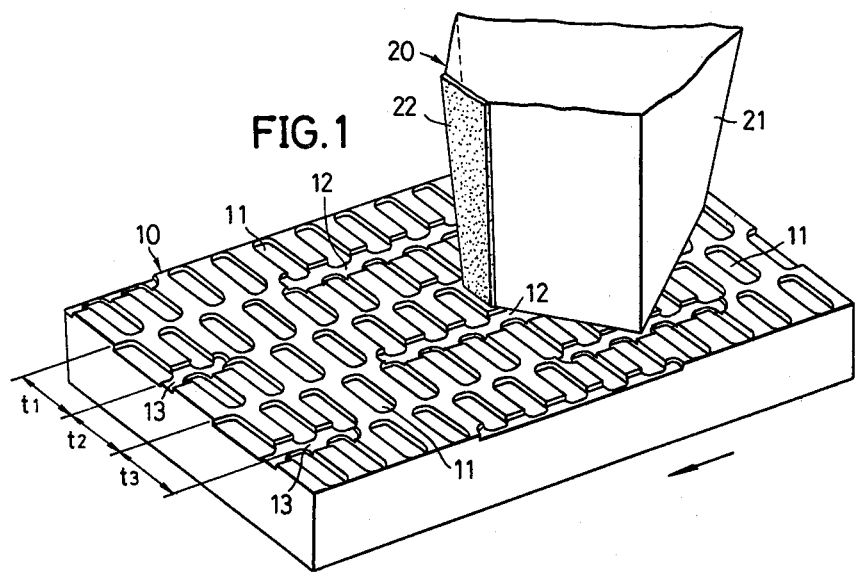
FIG. 1 is a perspective view showing a part of a rotary recording medium in an enlarged state together with a tip end part of a reproducing stylus.

The tip end of a reproducing stylus 20 has a shape shown in FIG. 1. The reproducing stylus 20 consists of a stylus structure 21 having a disc tracing surface which has a width greater than a track width, and an electrode 22 fixed to the rear face of the stylus structure 21. As the reproducing stylus 20 traces along a track on the disc 10 which is rotating in a direction indicated by an arrow, the video signal recorded thereon by the formation of pits is reproduced as variations in the electrostatic capacitance between the surface of the disc 10 and the electrode 22 of the reproducing stylus 20.

Figure 3:
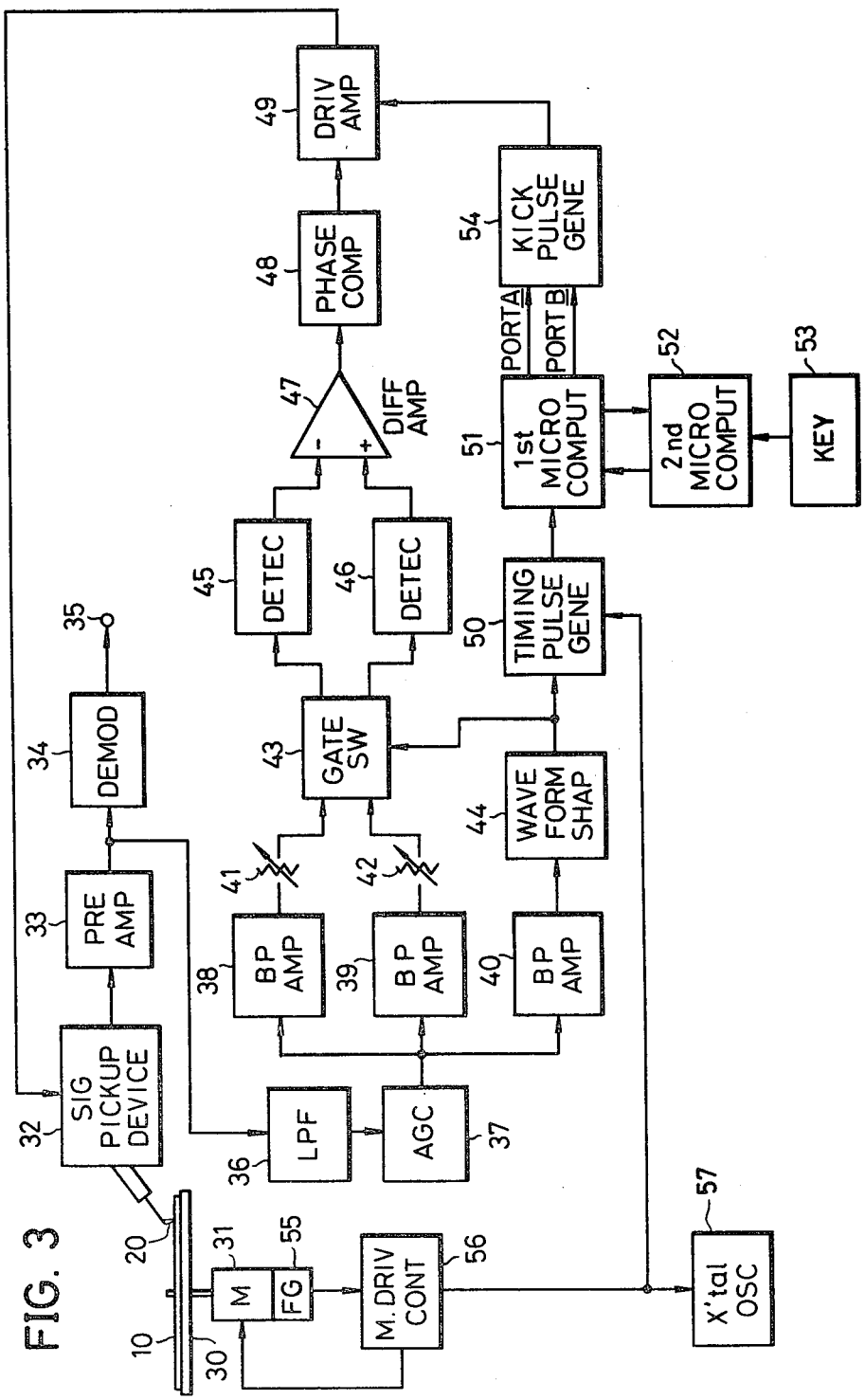
FIG. 3 is a systematic block diagram showing an embodiment of a rotary recording medium reproducing apparatus according to the present invention.

In FIG. 3, the disc 10 is placed onto a turntable 30, and rotated at a rotational speed of fifteen revolutions per second, that is, 900 revolutions per minute, by a motor 31. A reproduced signal picked up from the disc 10 as minute variations in the electrostatic capacitance by the reproducing stylus 20 of a signal pickup device 32, is supplied to a preamplifier 33 having a resonant circuit. The resonance frequency of the resonant circuit varies in response to this variation in the electrostatic capacitance, and is formed into a signal of a desired level. The resulting output of the preamplifier 33, is demodulated into the original video signal by a demodulator 34 and is obtained as an output through an output terminal 35.

The output signal of the preamplifier 33 is supplied to a lowpass filter 36 wherein the reference signals fp1, fp2, and fp3 are separated. The output reference signals pass through an automatic gain control circuit 37 and are respectively supplied to amplifiers 38, 39, and 40. Here, each of the amplifiers 38, 39, and 40 is a kind of a band-pass amplifier respectively designed to have steep passing frequency characteristics at only the respective frequency fp1, fp2 and fp3. As a result, the signals having frequencies fp1 and fp2 are respectively separated and obtained from the amplifiers 38 and 39. These signals respectively pass through level adjustors 41 and 42, wherein the levels of the signal are adjusted. The resulting signals are then supplied to a gate switching circuit 43.

The reference signal fp3 separated and amplified at the above band-pass amplifier 40, is supplied to a waveform shaping circuit 44 comprising a Schmitt circuit.

The signal thus supplied to the waveform shaping circuit 44 undergoes waveform-shaping so that the signal is not affected by noise and other influences. The reference signal fp3 thus subjected to the waveform-shaping, is supplied to the gate switching circuit 43 as a switching pulse, and also to a timing pulse generating circuit 50 which will be described hereinafter.

The gate switching circuit 43 performs switching of the reference signals fp1 and fp2 every one revolution period of the disc 10 upon normal reproduction, in response to the above switching pulse applied thereto. Hence, due to the switching pulse which reverses polarity every two frames (1/15 seconds), the reference signals fp1 and fp2 are always alternately supplied to detection circuits 45 and 46 with predetermined polarities, from the gate switching circuit 43.

The detection circuits 45 and 46 detect the envelopes of their respective input reference signals, and convert the input reference signals into DC voltages. These DC voltages are then respectively supplied to a differential amplifier 47. The differential amplifier 47 compares the output signals of the two detection circuits 45 and 46 which vary in response to the reproduced levels of the reference signals fp1 and fp2, and generates an output tracking error signal which indicates the tracking error direction and the error quantity. This error signal passes through a phase compensation circuit 48 and is further amplified to a specific level by a driving amplifier 49.

An output signal of the driving amplifier 49 is applied to a coil of the signal pickup device 32 as a control signal, to control the signal pickup device 32. Accordingly, a cantilever mounted with the reproducing stylus 20 undergoes displacement whereby the reproducing stylus 20 is tracking controlled so that the above tracking error signal becomes zero, that is, so that the reproducing stylus 20 correctly traces over the track T of the disc 10.

A rotation detection signal detected by a frequency generator 55 provided unitarily with the motor 31, and an output oscillation signal of a crystal oscillator 57 are supplied to a motor driving control circuit 56. Accordingly, the motor 31 is driven and controlled by an output of the motor driving control circuit 56. The output of the crystal oscillator 57 is also supplied to the timing pulse generating circuit 50. A concrete block system of these circuit parts are shown in FIG. 4.

When the frequency generator 55 generates N pulses for one revolution of the motor 31, in the present embodiment of the invention, the motor 31 rotates at a rotational speed of fifteen revolutions per second. Hence, the above frequency oscillator 55 generates $(15 \times N)$ pulses per second. Moreover, the crystal oscillator 57 oscillates at a frequency of $(15 \times M \times N \times 64)$. The oscillation output of the crystal oscillator 57 is frequency-divided into 1/M the original frequency at a 1/M-frequency divider 60. This frequency-divided output of the 1/M-frequency divider 60 is further frequency-divided into 1/64 the original frequency at a 1/64-frequency divider 61. Accordingly, an output signal having a frequency of $(15 \times N)$ is supplied to a phase comparator 62, wherein the phase of the signal is compared with the phase of the output signal having a frequency of $(15 \times N)$ which is obtained from the frequency generator 55. An output error signal of the above phase comparator 62 is applied to the motor 31, to control the rotation of the motor.

On the other hand, the above output of the crystal oscillator 57 is supplied to a 1/M-frequency divider 63 of the timing pulse generator circuit 50. This 1/M-frequency divider 63 consists of a counter which is reset by the third reference signal fp3 applied thereto from the waveform shaping circuit 44 through a terminal 64. Hence, the 1/M-frequency divider 63 frequency-divides the signal having a frequency of $(15 \times M \times N \times 64)$ which is obtained from the crystal oscillator 57. An output of the above 1/M-frequency divider 63 is further frequency divided into 1/N the original frequency at a 1/N-frequency divider 65, and obtained as a timing pulse having a frequency of $(15 \times 64)$, through a terminal 66. This timing pulse thus obtained from the terminal 66 supplied to a first micro-computer 51 for controlling the operation of the apparatus, as an interrupt signal. Here, the timing pulse is generated $(15 \times 64)$ times per second, that is, sixty-four timing pulses are generated for one revolution of the disc 10. In addition, since the counter 63 is reset by the reproduced third reference signal fp3, the timing pulse is in synchronism with the third reference signal fp3 for every sixty-four timing pulses.

A timing pulse TP thus obtained and supplied to the first micro-computer 51 is shown in FIG. 5A. Sixty-four of the above timing pulses TP exist for one revolution of the disc 10, and in FIG. 5A, the (k−1)th, k-th, (k+1)th, and (k+2)th timing pulses are shown.

On the other hand, before a reproducing operation is performed, or during a reproducing operation, a ten-key 53 is manipulated to set a mode from the special reproduction modes. In the present embodiment of the invention, the quickest quick-motion reproduction is a 65-times speed quick-motion reproduction, and for example, the mode is set for a 65-times speed quick-motion reproduction. The above setting is stored into a second micro-computer 52 for reading in key inputs or performing signal processing.

When the first micro-computer 51 is supplied with the timing signal TP shown in FIG. 5A as an interrupt signal, the first micro-computer 51 judges the special reproduction mode and performs signal processing and the like according to the special reproduction mode at an interval A1 after the timing signal, in accordance with the data obtained from the second micro-computer 52, every time the interrupt signal is supplied. At a succeeding interval A2, the micro-computer judges whether a kick pulse is to be produced according to the special reproduction mode which has been judged.

However, conventionally, as shown in FIG. 5B, the first micro-computer 51 supplied signals to the kick pulse generating circuit 54 so as to generate kick pulses $Q_{k-1}, Q_k, Q_{k+1}, \ldots$, after the interval A2 from the result obtained by the judgement performed at the interval A2. Moreover, during a 65-times speed quick-motion reproduction, sixty-four kick pulses must be generated, since the reproducing stylus must be kicked sixty-four times for one revolution of the disc. Accordingly, in this case, the kick pulse is generated with respect to each timing pulse. In addition, during a 33-times speed quick-motion reproduction, thirty-two kick pulses must be generated, since the reproducing stylus must be kicked thirty-two times for one revolution of the disc. In this case, the kick pulses $Q_{k-1}, Q_{k+1}, \ldots,$ are not generated, and every second pulses $Q_k, Q_{k+2}, \ldots,$ are generated.

Therefore, in the conventional apparatus, when a timing pulse $TP_k$ is obtained, for example, the kick pulse $Q_k$ was produced according to a judgement result obtained at the interval A2, after the intervals A1 and A2.

Thus, the time interval between the timing pulse $TP_k$ and the kick pulse $Q_k$ became large, and the search could not be performed rapidly especially during a high-speed search. Furthermore, the interval between the time when the kick pulse $Q_k$ is produced and the time when the next timing pulse $TP_{k+1}$ is obtained, which can be used to perform other signal processing, was short. In a case where considerable time was required for judgement and signal processing at the interval A2, there was a disadvantage in that errors could be introduced in the generating timing of the above kick pulse.

Figure 6:
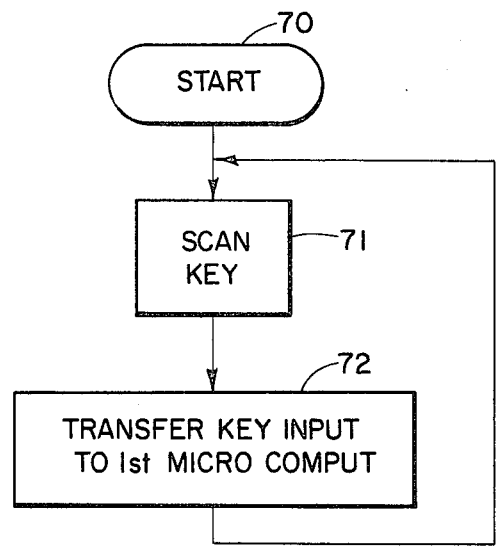
FIG. 6 is a flow chart showing the main operation of a second micro-computer in the block system shown in FIG. 3.

The operations of the first and second micro-computers 51 and 52 will now be described by use of flow charts. FIG. 6 is a flow chart showing the main operation of the second micro-computer 52. The main operation of the second micro-computer 52 starts from a step 70, and the ten-key 53 is scanned at a step 71 to judge the type of special reproduction mode which has been set. This judged information is transferred at a step 72 to the first micro-computer 51 to be processed.

Figure 7:
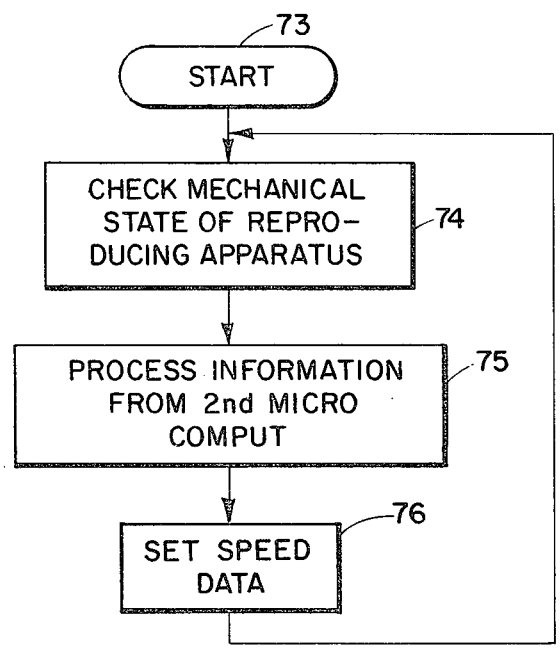
FIG. 7 is a flow chart showing the main operation of a first micro-computer in the block system shown in FIG. 3.

FIG. 7 is a flow chart showing the main operation of the first micro-computer 51. The main operation of the first micro-computer 51 starts from a step 73, and the mechanical state of the reproducing apparatus is checked at a step 74. At a succeeding step 75, the judged information from the second micro-computer 52 is processed. Thereafter, a step 76 is carried out to set the speed data, that is, set the reproducing speed and direction of the special reproduction.

Figure 9A:
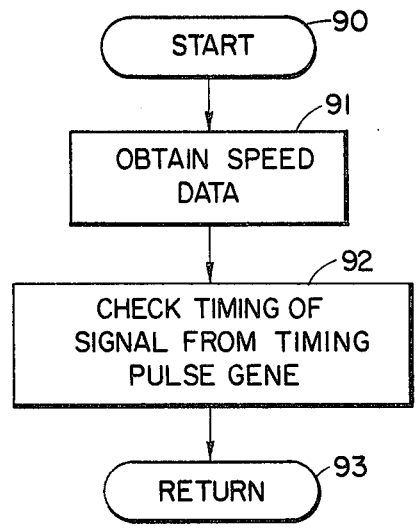
FIGS. 9A and 9B are flow charts respectively showing subroutines of the interrupt routine shown in FIG. 8.
Figure 9B:
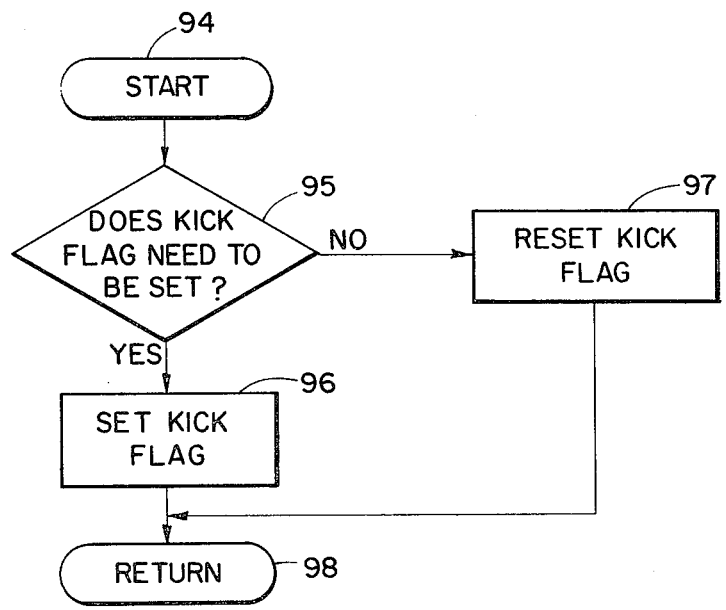

FIG. 8 is a flow chart showing the operation of the first micro-computer 51 when an interrupt signal is supplied thereto as described before. When the interrupt signal is applied to the first micro-computer 51, a step 80 is carried out to save various data so that the normal operation can be resumed after the interrupt. Thereafter, steps 81 and 82 are carried out in succession. A first judging subroutine carried out at the step 81, is shown in FIG. 9A. The first judging subroutine starts from a step 90, and the speed data described before are obtained at a step 91. A step 92 checks the timing of the signal from the timing pulse generating circuit 50, to determine the position of the reproducing stylus 20. A step 93 returns the operation to the interrupt routine shown in FIG. 8, and the succeeding step 82 is carried out. A second judging subroutine carried out at the step 82, is shown in FIG. 9B. The second judging subroutine starts from a step 94, and a step 95 judges if a kick flag needs to be set. This kick flag indicates that one or more kicks are to be carried out when it is set. A step 96 sets the kick flag if the kick flag needs to be set, and a step 97 resets the kick flag if the kick flag does not need to be set, according to the judgment result at the step 95. A step 98 returns the operation to the interrupt routine shown in FIG. 8, to carry out a succeeding step 83.

Figure 10C:
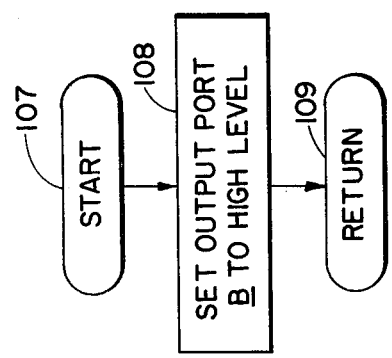
FIGS. 10A, 10B, and 10C are flow charts respectively showing subroutines of the interrupt routine shown in FIG. 8.
Figure 10B:
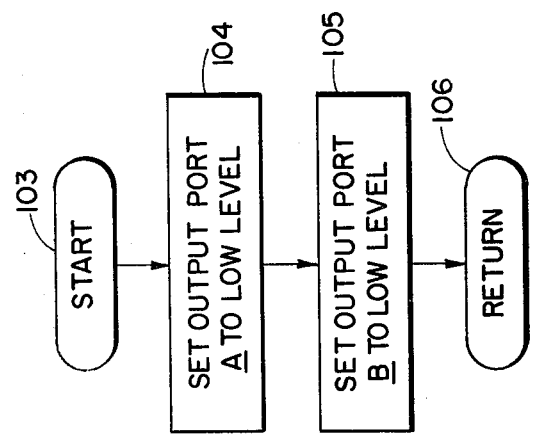
Figure 10A:
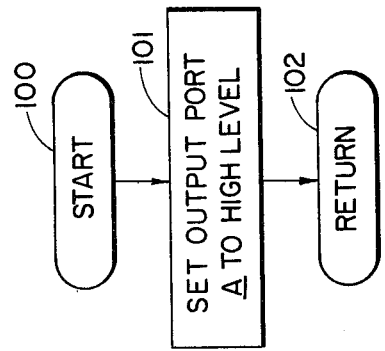

The step 83 discriminates whether the kick flag is set. If the kick flag is not set, that is, if the kick does not need to be carried out, a step 89 returns the operation to the main operation of the first micro-computer 51 shown in FIG. 7. On the other hand, if the kick flag is set, a step 84 is carried out. A subroutine "KICK 1" shown in FIG. 10A is carried out in the step 84. The subroutine "KICK 1" starts from a step 100, sets the level at an output port A of the first micro-computer 51 to high level at a step 101, and returns the operation to the interrupt routine at a step 102 to carry out a step 85 shown in FIG. 8. The step 85 is merely carried out to consume time. A succeeding step 86 carries out a subroutine "KICK 2" shown in FIG. 10B. The subroutine "KICK 2" starts from a step 103, sets the level at the output port A of the first micro-computer 51 to low level at a step 104, sets the level at an output port B of the first micro-computer 51 to low level at a step 105, and returns the operation to the interrupt routine at a step 106 to carry out a step 87 shown in FIG. 8. The step 87 is merely carried out to consume time. A subroutine "KICK 3" shown in FIG. 10C is carried out at a step 88. The subroutine "KICK 3" starts from a step 107, sets the level at the output port B of the first micro-computer 51 to high level at a step 108, and returns the operation to the interrupt routine at a step 109 to carry out the step 89 shown in FIG. 8. The step 89 returns the operation to the main operation of the first micro-computer 51 shown in FIG. 7.

The present invention has solved the above described problems in the following manner. The first micro-computer 51 performs an operation similar to that performed in the above described conventional example, during the time interval A1. However, the programs of the first and second micro-computers 51 and 52 are established so that judgement is performed on whether a kick pulse is to be produced with a timing corresponding to a succeeding timing signal, at the next interval A2. For example, as shown in FIGS. 5A and 5C, judgement is performed on whether a kick pulse $P_{k+1}$ corresponding to the (k+1)th timing pulse $TP_{k+1}$ is to be produced, at the interval A2 corresponding to the k-th timing pulse $TP_k$. Similarly, the kick pulse $P_k$ is produced according to the judgement performed during the interval A2 corresponding to the preceeding (k−1)th timing pulse $TP_{k-1}$, in addition to performing the above judgement at the interval A2 corresponding to the timing pulse $T_k$. Moreover, in a similar manner, judgement is performed on whether the kick pulse $P_{k+2}$ corresponding to the (k+2)th timing pulse $TP_{k+2}$ is to be produced, at the interval A2 corresponding to the (k+1)th timing pulse $TP_{k+1}$. In addition, the kick pulse $P_{k+1}$ is produced according to the judgement performed during the interval A2 corresponding to the above k-th timing pulse $TP_k$.

Figure 11:
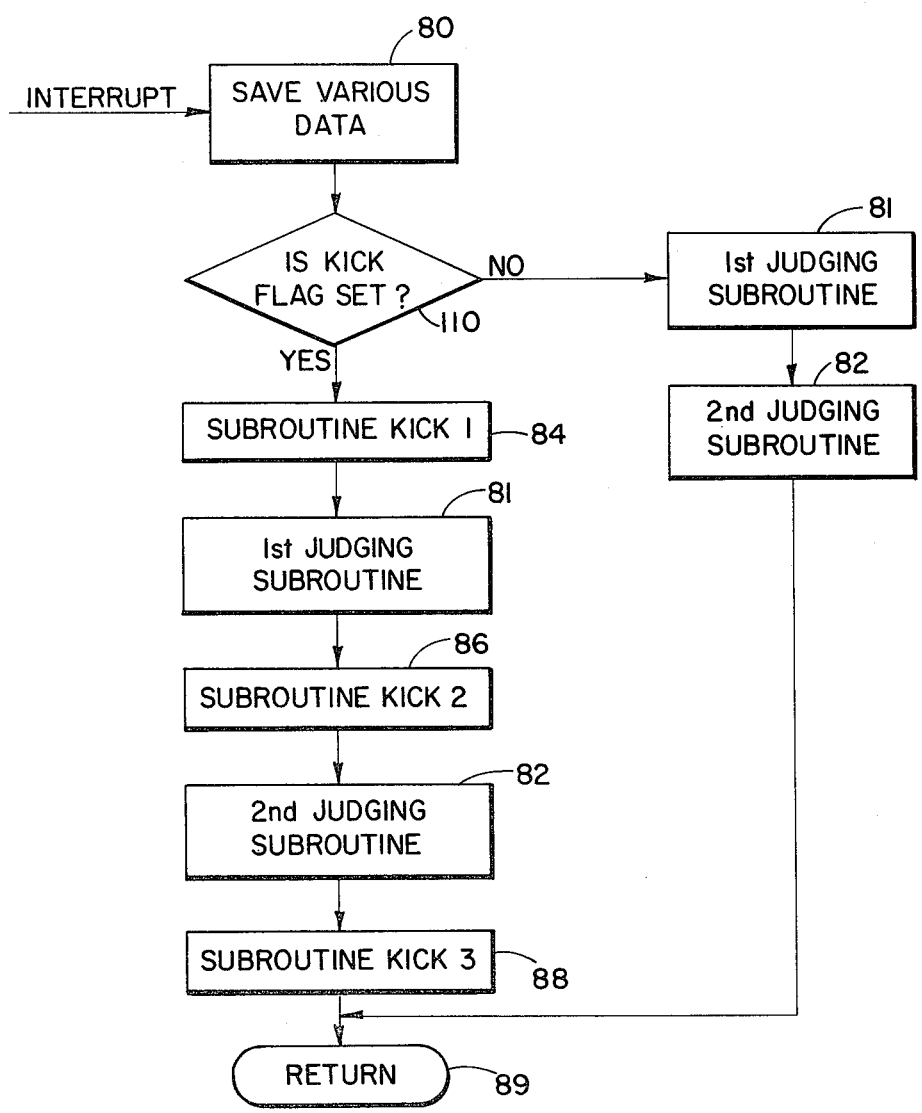
FIG. 11 is a flow chart showing an embodiment of an interrupt routine of the first micro-computer according to the present invention.

The main operations of the first and second micro-computers 51 and 52 according to the present invention are the same as those described before in conjunction with FIGS. 7 and 6. However, according to the present invention, when the interrupt signal is applied to the first micro-computer 51, and interrupt routine shown in FIG. 11 is executed. In FIG. 11, those steps which are the same as those corresponding steps in FIG. 8 are designated by the same reference numerals, and detailed description of each of the steps will be omitted. According to the present invention, a step 110 is carried out successive to the step 80. The step 110 determines whether the kick flag has been set or reset according to the previous judgment, that is, according to the speed data obtained with respect to the previous timing pulse. If the kick flag is not set, the steps 81 and 82 are carried out to execute the subroutines shown in FIGS. 9A and 9B, and the step 89 returns to the operation to the main operation of the first micro-computer 51 shown in FIG. 7. However, in the present invention, the judgment is carried out with respect to the succeeding timing pulse when the subroutines in the steps 81 and 82 are executed, although the judgment was carried out with respect to the present timing pulse when these subroutines in steps 81 and 82 were executed. On the other hand, if the kick flag is set, steps 84, 81, 86, 82, and 88 are carried out in the sequence shown in FIG. 11. The steps 84, 81, 86, 82, and 88 are the same as those steps shown in FIG. 8, and these steps carry out the same subroutines as those shown in FIGS. 9A through 10C. However, in the present invention, the judgment is carried out with respect to the succeeding timing pulse when the subroutines in the steps 81 and 82 are executed, and the signals are generated through the output ports A and B of the first micro-computer 51 according to the speed data obtained with respect to the previous timing pulse when the subroutines in the steps 84, 86, and 88 are executed. On the other hand, in the conventional apparatus, the judgment was carried out with respect to the present timing pulse when the subroutines in the steps 81 and 82 were executed, and the signals were generated through the output ports A and B of the first micro-computer 51 according to the speed data obtained with respect to the present timing pulse when the subroutines in the steps 84, 86, and 88 were executed, as described before.

Figure 12:
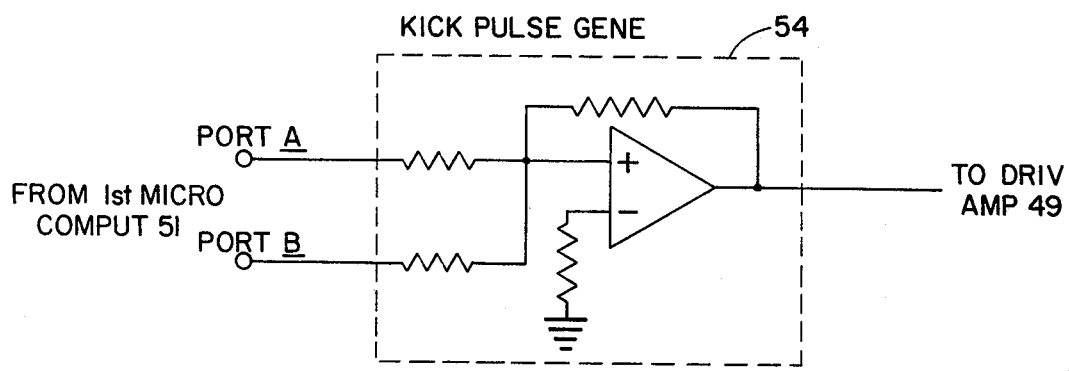
FIG. 12 is a circuit diagram showing an example of a kick pulse generating circuit in the block system shown in FIG. 3.
Figure 13A:
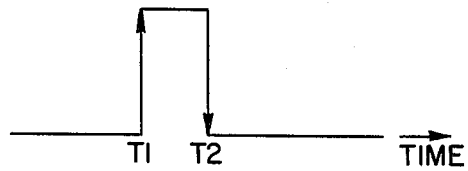
FIGS. 13A, 13B, and 13C respectively are graphs showing input signals and an output signal of the kick pulse generating circuit.
Figure 13B:
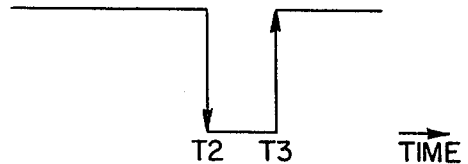
Figure 13C:
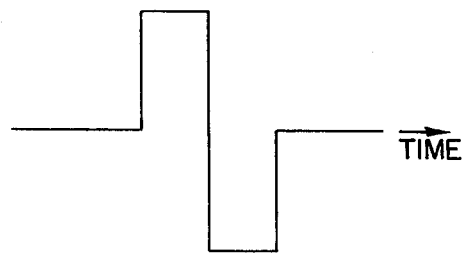

The kick pulse generating circuit 54 has a circuit construction shown in FIG. 12, for example. The circuit shown in FIG. 12 is essentially an adder for adding the signals obtained through the output ports A and B of the first micro-computer 51. FIG. 13A shows an example of an output obtained through the output port A, and FIG. 13B shows an example of the output obtained through the output port B. In FIGS. 13A and 13B, a time T1 corresponds to the time when the subroutine "KICK 1" shown in FIG. 10A is carried out. Similarly, times T2 and T3 respectively correspond to the times when the subroutines "KICK 2" and "KICK 3" shown in FIGS. 10B and 10C are carried out. The resulting added output signal of the kick pulse generating circuit 54, which is supplied to the driving amplifier 49, thus becomes as shown in FIG. 13C. The waveform of the signal shown in FIG. 13C is the same as those of the kick pulses shown in FIG. 5C.

The kick pulse consists of a positive polarity pulse and a negative polarity pulse, and the pulse widths of the respective pulses are 150 $\mu$sec, for example. The processing operation performed by the micro-computer 51 during this 150 $\mu$sec is predetermined, and for example, performs an operation of fifty steps wherein each step is 3 $\mu$sec long. Signal processing such as read out of data from registers within the micro-computer 51 is performed within this interval of 3 $\mu$sec, to judge whether the kick pulse is to be produced or not. Accordingly, when fifty steps of the 3 $\mu$sec units are performed after the rising edge of the kick pulse, 150 $\mu$sec are required to performed this operation, and the kick pulses fall upon completion of the above operation. The kick pulse then rises after lapse of 150 $\mu$sec, and the kick pulse is accordingly produced. Hence, other signal processing operations can be performed during the time the above kick pulse is produced. Moreover, since the signal processing by performing a predetermined number (fifty steps) of operations having predetermined time units (3 $\mu$sec), the kick pulse can be produced according to these signal processing operations. There is no need to provide a timer for performing a time delay of 150 $\mu$sec, for example, for producing the kick pulse. That is, the idling steps 85 and 87 shown in FIG. 8 which were required in the conventional apparatus, are not required in the present invention.

Upon actual use, the positive polarity pulse and the negative polarity pulse are respectively obtained from the ports A and B of the micro-computer 51. These pulses are supplied to the kick pulse generating circuit 54 shown n FIG. 1, and formed into a kick pulse having a waveform shown in FIG. 5C. The kick pulse obtained from the kick pulse generating circuit 54 is supplied to the tracking coil of the signal pickup device 32, through the driving amplifier 49. Therefore, the reproducing stylus 20 is kicked towards the outer or inner peripheral direction of the disc 10 by one track pitch.

In a case where the tracking coil of the reproducing stylus 20 is applied with a kick pulse which consists of a positive polarity pulse followed by a negative polarity pulse, the reproducing stylus 20 is kicked towards the inner peripheral direction of the disc 10, for example. On the other hand, when the tracking coil of the reproducing stylus 20 is applied with a kick pulse consisting of a negative polarity pulse followed by a positive polarity pulse, the reproducing stylus 20 is kicked towards the outer peripheral direction of the disc 10, for example. The micro-computer 51 supplies signals to the kick pulse generating circuit 54 so as to produce the kick pulse of the above polarities according to whether the special reproduction mode set into the micro-computer 52 by the ten-key 53 is a quick-motion reproduction mode or a slow-motion reproduction mode. Moreover, the number of kick pulses generated for one revolution of the disc differs according to the quick-motion ratio and the slow-motion ratio. However, regardless of the reproduction mode, judgement is always performed on whether the kick pulse is to be produced, during the above interval A2. During a normal reproduction mode, since the reproducing stylus is not kicked, judgement is performed on whether the kick pulse is to be produced during the above interval A2, however, judgement is made that there is no need to produce the kick pulse and the kick pulse is accordingly not produced.

The above described relatively fast quick-motion reproduction modes such as the 65-times speed and 33-times speed quick-motion reproduction are not only used simply for quick-motion reproduction. These modes can be used for random access or high-speed search modes in which, when the reproducing stylus is transferred at a high speed to a target position, the transferring speed is reduced to that of a quick-motion reproduction mode when the reproducing stylus reaches a position near the target position and the reproducing stylus is accurately transferred unto the target position.

Therefore, according to the apparatus of the present invention, the kick pulse is produced with respect to each timing pulse immediately after the interval A1. Accordingly, the interval between the timing pulse and the kick pulse is short, and search can be made in a rapid manner during a high-speed search. Moreover, the time interval between the time when the kick pulse is produced and the time when the next timing pulse is obtained can be made long, in order to effectively use this time interval for other signal processing operations.

Further the present invention is not limited to these embodiments, but various variations and modifications may be made without departing from the scope of the present invention.

What is claimed is:

1. A reproducing apparatus for reproducing signals from a rotary recording medium, said rotary recording medium having an information signal recorded on a spiral track and at least one reference signal recorded at a predetermined position on each track turn of said rotary recording medium, said reproducing apparatus comprising:

a reproducing transducer means comprising a reproducing element for reproducing signals from tracks on said rotary recording medium and kicking means for kicking said reproducing element to an adjacent track in response to a kick pulse;

timing pulse generating means for generating timing pulses according to the reproduced reference signal, a number of the generated timing pulses being equal to a maximum number of kicking positions for one track turn of said rotary recording medium;

mode setting means for manually setting an operating mode of said reproducing apparatus to one of special reproduction modes;

first judging means for judging the mode of said reproducing apparatus according to the mode set by said mode setting means;

second judging means coupled to said timing pulse generating means and said first judging means, for judging whether a kick pulse is to be generated within an interval in correspondence with a subsequent timing pulse and for producing pulse signals according to a judgment result obtained during an interval in correspondence with a preceding timing pulse, with respect to each of said timing pulses from said timing pulse generating means according to the judgment result from said first judging means; and kick pulse generating means for generating kick pulses in accordance with the pulse signals supplied from said second judging means, said kick pulses being supplied to said reproducing transducer to kick said reproducing element according to the set special reproduction mode of said reproducing apparatus.

2. A reproducing apparatus as claimed in claim 1 in which said first judging means judges the mode of said reproducing apparatus during first processing intervals respectively subsequent to each of said timing pulses, said second judging means judging whether a kick pulse is to be generated within the interval in correspondence with the subsequent timing pulse and producing the pulse signals according to the judgment result obtained during the interval in correspondence with the preceding timing pulse during second processing intervals respectively subsequent to each of said first processing intervals, and said kick pulse generating means generates said kick pulses within said second processing intervals.

3. A reproducing apparatus as claimed in claim 2 in which said second judging means carries out other signal processing during third processing intervals, each of said third processing intervals being an interval between a point in time immediately subsequent to said second processing interval and a point in time immediately preceding a subsequent timing pulse from said timing pulse generating means.

4. A reproducing apparatus as claimed in claim 2 in which a width of said kick pulses is determined by a total execution time of steps carried out by said second judging means within said second processing interval.

5. A reproducing apparatus as claimed in claim 1 in which said timing pulse generating means comprises an oscillator for generating a reference frequency signal and frequency dividing means for frequency-dividing said oscillation output reference frequency signal and obtaining said timing signal, and said frequency dividing means includes a counter reset by the reproduced reference signal, for producing a signal synchronized with said reference signal.

6. A reproducing apparatus as claimed in claim 1 in which sixty-four of said timing pulses are generated for one track turn of said rotary recording medium.

* * * * *